United States Patent [19]

Benoit et al.

[11] Patent Number: 5,618,630

[45] Date of Patent: Apr. 8, 1997

[54] CROSS-LAMINATED MULTILAYER FILM STRUCTURE FOR USE IN THE PRODUCTION OF BANKNOTES OR THE LIKE

[75] Inventors: Gordon L. Benoit, Victor; Rudolph VanderVelden, Macedon, both of N.Y.

[73] Assignee: Mobil Oil Corporation, Fairfax, Va.

[21] Appl. No.: 601,886

[22] Filed: Feb. 15, 1996

Related U.S. Application Data

[63] Continuation of Ser. No. 266,916, Jun. 27, 1994, abandoned.

[51] Int. Cl.$^6$ .................................................. B32B 9/00
[52] U.S. Cl. ........................ 428/500; 428/516; 428/910
[58] Field of Search ...................... 428/35.1, 500, 428/516, 910, 349, 240, 35.4, 332, 35.2

[56] References Cited

U.S. PATENT DOCUMENTS

| | | | |
|---|---|---|---|
| 3,322,613 | 2/1963 | Rasmussen | 428/434 |
| 4,095,217 | 6/1978 | Tani et al. | 340/324 R |
| 4,247,584 | 1/1981 | Widiger | 428/35.4 |
| 4,276,347 | 6/1981 | Shimada | 428/332 |
| 4,281,208 | 7/1981 | Kuwano et al. | 136/249 |
| 4,331,725 | 5/1982 | Akao | 428/910 |
| 4,359,499 | 11/1982 | Akao | 428/201 |
| 4,472,627 | 9/1984 | Weinberger | 235/487 |
| 4,536,016 | 8/1985 | Solomon et al. | 283/111 |
| 4,565,733 | 1/1986 | Akao | 428/515 |
| 4,680,207 | 7/1987 | Murray | 428/35.2 |
| 4,853,265 | 8/1989 | Warren | 428/516 |
| 4,865,908 | 9/1989 | Liu | 428/511 |
| 5,275,870 | 1/1994 | Halope | 428/199 |
| 5,482,771 | 1/1996 | Shah | 428/349 |

FOREIGN PATENT DOCUMENTS

| | | | |
|---|---|---|---|
| 488652 | 4/1976 | Australia | 52/64.2 |
| 1287527 | 8/1972 | United Kingdom . | |

*Primary Examiner*—Patrick Ryan
*Assistant Examiner*—Patrick Jewik
*Attorney, Agent, or Firm*—L. F. Cuomo

[57] ABSTRACT

A laminated multilayer film substrate for use in the production of banknotes. The film substrate includes a first layer comprising at least about 50 weight percent of a high density polyethylene having a density of at least about 0.95, the first layer oriented in at least a first direction to a degree which is at least three times greater than the degree of orientation present in a direction substantially normal to the first direction, and a second layer comprising at least about 50 weight percent of a high density polyethylene having a density of at least about 0.95, the second layer oriented in at least a first direction to a degree which is at least three times greater than the degree of orientation present in a direction substantially normal to the first direction, wherein the second layer is laminated to the film substrate so that the first direction of orientation of the second layer is substantially normal to the first direction of orientation of the first layer. The resultant films having good dead-fold characteristics and other properties, making them highly suited for the production of bank notes and other security documents.

14 Claims, No Drawings

CROSS-LAMINATED MULTILAYER FILM STRUCTURE FOR USE IN THE PRODUCTION OF BANKNOTES OR THE LIKE

This is a continuation of application Ser. No. 08/266,916, filed on Jun. 27, 1994, now abandoned.

FIELD OF THE INVENTION

The present invention relates to a multilayer film for use in the production of paper-like products such as bank notes, security documents, including travellers and bank checks, and to a method for their production. More particularly, the present invention relates to a multilayer film having the characteristics of the high quality papers typically employed in the production of bank notes and security documents.

BACKGROUND OF THE INVENTION

In the production of bank notes, security documents and the like, rag paper has been employed for over 300 years. As is well known, rag paper has several properties which are highly desirable in such applications, including dead foldability, tear resistance, printablilty and embossability.

These highly desired properties may be characterized as follows: deadfold is the ability of a substrate to be creased or folded and to retain the fold without opening. Tear resistance is the ability of a substrate to resist both initiated and uninitiated tears and punctures. Printability is the ability of the substrate to adsorb and bond inks used during the lithographic printing process. Embossability is the ability of the substrate to deform under the pressures of the intaglio printing process to form a raised image on the resulting bank note or security document, with the intaglio ink remaining on the raised, deformed region resulting in a high degree of tactility or feel to the bank note or security document. As may be appreciated, these properties combine to give bank notes and the like their familiar feel and functionality.

With the advent of color copiers and computer graphic scanners, the counterfeiting of bank notes has markedly increased. While there are active programs underway by major currency paper producers to make their substrate more secure through the use of watermarks, metallized threads and optical variable devices (OVD's), such as photochromics, holographics, and diffraction gratings, at this time, these efforts do not appear to hold much promise of thwarting counterfeiters.

Plastic substrates offer a major security feature if a clear "window" is incorporated into the bank note. This window would ensure that a scanner or color copier could not copy the note. Additionally, other security features can be incorporated into or onto the bank note, including reverse printing of the note to protect the security devices and the print.

Australian Pat. No. 488,652, discloses an approach to the production of security articles, particularly bank notes, and describes the serious problems which confront conventional bank notes with respect to forgery. The bank note disclosed therein comprises a substrate of opaque thermoplastic sheet material intimately bonded to a web of woven or unwoven thermoplastic fibers, the substrate being printed as desired and having bonded thereon one or more optically-variable security devices. The fibrous web was employed to impart durability, crumple-resistance and tear-strength to the note. Where a security device, such as a Moire pattern, was employed which depended for its optically variable properties upon the transmission of light, it was necessary to punch out a hole in the substrate, insert the device and bond it in place with further layers of transparent plastic sheet material.

Although samples of bank notes formed according to the disclosure of Australian Patent No. 488,652 were said to have performed most satisfactorily with respect to the durability and security of conventional notes, they were found to be rather complex in construction and relatively expensive to produce. Moreover, when transmission security devices were inserted in pockets in the substrate, an area of weakness and high stress was created which reduced both durability and security.

Other disclosures relating to anti-counterfeiting techniques include U.S. Pat. Nos. 4,095,217 and 4,281,208, which relate to the use of a liquid crystal device driven by a photovoltaic element, such as a solar cell or an amorphous silicon material.

U.S. Pat. No. 4,472,627 relates to currency or other valuable documents containing a liquid crystal/photovoltaic device which produces a coded display in response to artificial or ambient light. The device can function both as an anti-counterfeiting deterrent and also as a means for permitting a user to easily authenticate the validity of a document containing such a device.

U.S. Pat. No. 4,536,016 discloses a security token, such as a bank note or identity card, which comprised a sheet-like substrate made up from film of transparent biaxially oriented polymer coated with layers of opaque and heat activated adhesive material. The opaque layer is applied in such a way as to leave a transparent area for inspection of a security device, for example, a diffraction grating, incorporated in the polymer film. The substrate could bear printed or other identifying indicia and was protected with an intimately bonded layer of transparent polymeric material.

The substrate employed in U.S. Pat. No. 4,536,016 was based on the use of oriented polypropylene (OPP). After several commemorative bank note printings, while meeting many of the requirements for a bank note substrate, the plastic bank notes were found to fail in three major areas. First, the OPP substrate did not dead fold, causing problems in that the film retains either a flat or curved form, jamming cash registers and automatic handling equipment. Second, the OPP substrate has poor initiated tear resistance in the processing of currency, quite frequently nicks are created on the edges of bills, with OPP these result in catastrophic tears. Finally, the OPP product did not exhibit the tactility of paper currency, due to the fact that OPP does not emboss during the intaglio process.

Oriented high density polyethylene films have been employed in the area of plastic packaging. Such films, biaxially oriented to a degree of greater than 6.5 times in both the machine direction (MD) and the transverse direction (TD) are described in British Patent 1,287,527. U.S. Pat. No. 4,680,207 relates to imbalanced biaxially oriented films of linear low density polyethylene oriented up to six times in the machine direction, and up to three times in the transverse direction but less than in the machine direction.

While the aforementioned films have been shown to offer certain advantages over the prior art and generally meet the requirements for which they were designed, a need still exists for a film which provides the characteristics of a high quality, rag-type paper of the type typically employed in the production of bank notes and security products.

SUMMARY OF THE INVENTION

In accordance with the present invention, there is provided a laminated multilayer film substrate for use in the production of banknotes and security documents. The film substrate includes a first layer comprising at least about 50 weight percent of a high density polyethylene having a density of at least about 0.95, the first layer oriented in at least a first direction to a degree which is at least three times greater than the degree of orientation present in a direction substantially normal to the first direction, and a second layer comprising at least about 50 weight percent of a high density polyethylene having a density of at least about 0.95, the second layer oriented in at least a first direction to a degree which is at least three times greater than the degree of orientation present in a direction substantially normal to the first direction, wherein the second layer is laminated to the film substrate so that the first direction of orientation of the second layer is substantially normal to the first direction of orientation of the first layer.

The resultant films exhibit good dead-fold characteristics and other properties, making them highly suited for the production of bank notes and other security documents.

Therefore, it is an object of the present invention to provide a multilayer film having the characteristics of a high quality rag paper.

It is another object of the present invention to provide such a multilayer film which possesses the dead-fold characteristics of high quality papers and is easy to manufacture and is reasonably durable.

It is a further object of the present invention to provide a multilayer film which possesses a high degree of tear resistance to both initiated and uninitiated tears and punctures.

It is yet another object of the present invention to provide a multilayer film which possesses the printability and embossability of a high quality paper.

Other objects and the several advantages of the present invention will become apparent to those skilled in the art upon a reading of the specification and the claims appended thereto.

DETAILED DESCRIPTION OF THE INVENTION

In forming the multilayer film substrates for use in the production of the bank notes and other security documents of the present invention, at least two layers of the substrate are to contain a major proportion of a high density polyethylene (HDPE) having a density of at least about 0.95. These film layers may be composed exclusively of a single HDPE resin, a mixture of HDPE resins, or of HDPE containing a minor proportion of another polymeric material, such as low density polyethylene, linear low density polyethylene, polypropylene, ethylene vinyl alcohol (EVOH) copolymer, ethylene propylene (EP) copolymer or ethylene propylene butene-1 (EPB) copolymer, although a single HDPE resin or a blend of HDPE resins is particularly preferred in the practice of the present invention. The use of processing additives, such as microcrystalline wax or the like may be employed with the preferred HDPE resins to yield improved processing characteristics in the extruder by reducing extruder torque. Films made with either a blend of HDPE resins or with microcrystalline wax have been found to reduce the splittiness of the film which manifests itself as the tendency of the film to break in the TD direction.

When blends of HDPE polymers are employed, such blends can comprise two or more polymers all of which preferably have densities of 0.95 or greater. Blends of HDPE polymers advantageously comprise a major proportion of HDPE having a melt index of 0.6 to 1.2 and one or more polymers having a different melt index.

Terblends may also be desirable. Suitable terblends generally comprise 50 to 98 weight percent, preferably 84 to 96 weight percent of HDPE having a density of 0.96 or higher and a melt index of greater than 0.5 to about 2.0; 1 to 25 weight percent, preferably 3 to 8 weight percent of HDPE having a density of 0.96 or greater and a melt index of 0.1 to 0.5; and 1 to 25 weight percent, preferably 3 to 8 weight percent, of HDPE having a density of 0.96 or higher and a melt index of greater than 2 to about 8. Preferably, the second and third HDPE polymers which are minor components are present in about equal amounts.

As will be described in more detail hereinbelow, it has been discovered that directional tear resistance in a multilayer film substrate is substantially improved when at least two of the layers of the multilayer film substrate are laminated so that the major (primary) directions of orientation for each of those layers are aligned so as to be substantially normal to one another. This improvement in tear resistance, when coupled with the excellent dead-fold, embossability and printability characteristics of HDPE resins, provides a multilayer film structure having the properties long desired in the production of banknotes, security documents and the like.

As is particularly preferred, the film substrate of the present invention includes a first layer comprising at least about 50 weight percent of a high density polyethylene having a density of at least about 0.95, the first layer oriented in at least a first direction to a degree which is at least three times greater than the degree of orientation present in a direction substantially normal to the first direction, and a second layer also comprising at least about 50 weight percent of a high density polyethylene having a density of at least about 0.95, the second layer also oriented in at least a first direction to a degree which is at least three times greater than the degree of orientation present in a direction substantially normal to the first direction, the second layer being laminated to the film substrate so that the first direction of orientation of the second layer is substantially normal to the first direction of orientation of the first layer.

As may be appreciated, to achieve the object of improved tear resistance in a multilayer film of the type describe herein, it is not necessary that the first and second HDPE film layers be merely uniaxially oriented, since it has been discovered that imbalanced biaxially oriented HDPE films, laminated so that their primary directions of orientation are aligned substantially normal to each other, can perform in a substantially similar manner. A method of producing HDPE films with imbalanced biaxial orientation is disclosed in U.S. Pat. No. 4,870,122, the contents of which are incorporated by reference in their entirety.

The degree of orientation of the HDPE film layers is an important aspect of this invention inasmuch as the proper degree of orientation provides desirable physical properties. Although higher density HDPE resin having a density of 0.957 or greater can be made directly into thin films by cast extrusion, problems of curling, uniformity and flatness exist. Accordingly, thin HDPE films of about 0.8 to 1.5 mils having the best balance of properties are obtained using imbalanced biaxially oriented films prepared from films having a cast gauge of 12 to 20 mils which are reduced to the desired gauge by orientation.

The films are produced and oriented in a conventional manner. The film is heated to its orientation temperature and first subjected to MD orientation between two sets of nip rolls, the second rotating at a greater speed than the first in an amount equal to the desired draw ratio. Then the film is TD oriented by heating and subjecting it to transverse stretching in a tenter frame. Typically MD orientation is conducted at 60° to 120° C. and TD orientation at 110° to 145° C.

While it is preferred that the degree of orientation in a first film direction be at least three times greater than the degree of orientation present in a direction substantially normal to the first direction, it is more particularly preferred that each HDPE film layer be oriented to an extent of about 1.1 to about 2.0 times in the machine direction (MD) and about 6 to about 12 times in the transverse direction (TD). It has been found that the HDPE film layers can be produced with excellent quality at caster speeds of up to about 110 fpm corresponding to line speeds of 140 fpm at 1.25 times MD orientation.

When employed, this degree of imbalanced orientation produces an interesting effect in the HDPE components of the structure. The effect is a visible rippled and striated appearance, with the ripples being parallel to the transverse orientation direction. Under low magnification, in each square centimeter of HDPE film there will be seen from about 5 to about 30 discontinuous undulating ripples and striations generally parallel to the direction of orientation. This effect gives the film a slight translucent appearance, which tends to slightly blur distant objects viewed through the film. This effect indicates that the layers have been oriented in an imbalanced manner. The high density polyethylenes contemplated for use in the practice of the present invention include those disclosed in U.S. Pat. No. 4,870,122.

To achieve the desired surface characteristics required of the paper-like products of the present invention, one or more skin layers can be applied, in any known manner, to the multilayer HDPE substrate material, for example by coating or coextrusion before orientation or by coating the HDPE after one or both of the orientation operations. The skin layer can be any of the conventional material used for this purpose in conjunction with polyolefin films particularly polyethylene films. For example, to achieve a press-ready surface, a polymeric resin could be blended with fillers, fibers, pigments or the like, as necessary. Additionally, voided films, such as those disclosed in U.S. Pat. Nos. 4,377,616, 4,632,869, 4,758,462 and others, may be laminated to the multilayer HDPE substrate to impart the properties of those structures to the films of the present invention.

It is also envisioned that the substrate can be embossed, dyed, printed, texturised or otherwise treated before or after lamination; this being done on the internal or external surfaces of the laminated layers, so as to provide, for example, visual and/or tactile identification of the nature of a banknote, its significance or value.

The laminating techniques which can be employed to effect the present invention are known in the art and include: adhesive-bonding or cementing, preferably with a transparent agent; solvent-bonding, where a mist of solvent is sprayed over the surfaces to be bonded together; heat-bonding where thermoplastic sheets are subject to a hot rolling or pressing operating; cast-lamination where one layer is cast onto the second and the second forms a substrate; or, extrusion or draw-lamination as in calandering operations known in the art. When optically-variable devices (OVD's) are used, they can be enclosed in pouches affixed to the substrate. On the other hand, the optically-variable devices themselves may be incorporated in one (or both) layers of the laminated substrate or between the layers, it not being necessary to incorporate a physically discrete device within a clearly defined pouch formed between the laminae.

As employed in the present specification, the term "optically-variable" is used to denote any device which can readily be made to change appearance in a reversible, predictable and reproducible manner. The appearance of such devices may be altered, for example, by the application of body-heat or manual pressure, the variation of the angle of viewing and, the lighting conditions under which viewing takes place. The type of devices envisioned by the present invention are: diffraction gratings, liquid crystals, moire patterns and similar patterns produced by cross-gratings with or without superimposed, refractive, lenticular and transparent grids, such as Fresnel lenses, spaced partially-reflective, and partially transparent, coatings yielding variable interference patterns or the like, bi-refringent or polarising layers, zone-plates and the like.

Generally, optically-active devices of this nature are readily recognized by unskilled persons and are yet extremely difficult to reproduce by photographic and printing techniques. Moreover the production of any one such device in a reproducible fashion and the incorporation of such a device in a plastic laminate as described by the present invention is likely to be beyond the resources of the great majority of would-be forgers. Where a flexible paper-like product such as a bank-note is sought, it is of course preferable that the optically-variable devices should, themselves, be sheet-like, flexible and thin; it is also preferable for such devices to be compatible with the plastic material employed for the laminae to facilitate bonding and mitigate against reactive changes occurring with time.

According to the present invention, one preferred form of optically variable device may be a reflecting diffraction grating consisting of a metallized thermoplastic film embossed with a diffraction pattern. To prevent access to the embossed pattern for the purpose illicit replication, it is preferable according to the present invention to employ a layer of thermoplastic material on each side of the metallized film which has similar solubility characteristics to that of the metal layer so that separation by preferential etching will be rendered extremely difficult. Another preferred device is a moire pattern formed by photographically reproducing fine line or dot patterns on each side of a thin film. The spacings of the dots and lines can be readily made too fine to be reproduced by printing techniques and yet the moire pattern can be displayed upon a much larger scale. Unique diffraction and moire patterns will often be preferred for use in bank notes and techniques are available for producing those by computer and photo-reduction methods.

In the production of low denomination bank notes, a suitable level of security against counterfeiting may be obtained by merely a providing a clear "window" through the bank note. As indicated above, such a window would ensure that a scanner or color copier could not copy the note.

Additionally, other security features can be incorporated into or onto the bank note, including reverse printing of the note to protect the security devices and the print.

The multilayer film of the present invention can also be used in applications requiring properties of high durability, and high quality printability, e.g., as labels.

The invention is illustrated by the following non-limiting examples in which all parts are by weight unless otherwise specified.

EXAMPLE 1 (COMPARATIVE)

The film of this example was produced for comparison with a film produced in accordance with the present invention.

A multilayer layer oriented film substrate having a 1.15 mil final thickness was prepared by coextruding HDPE with copolymer polypropylene skins on both sides to form a first layer (a). The HDPE resin employed was Oxychem M-6211, available from Occidental Chemical Corporation, Dallas, Tex., having a density of 0.96 and a melt index of 1.0. The copolymer polypropylene skins comprised 90% Chisso 7510, an ethylene-propylene-butene-1 terpolymer available from Chisso Corporation of Japan, and 10% Mobil LKA-753, a low density polyethylene available from Mobil Chemical Co., Norwalk, Conn. The HDPE comprised 90% of the resulting film layer (a) while the skins comprise 10% (5% on each side). A second film layer (b) identical to (a) was also formed. The first and second films (a) and (b) were then oriented 1.4 times in the MD at about 115° C. and 6 to 12 times, e.g., 10 times, in the TD direction at 115°–140° C. in a tenter frame.

The copolymer skins on the inner side of oriented layers (a) and (b) were then coated with a polyethyleneimine (PEI) primer to form clear 1.15 mil OHD films.

On film (a) can be deposited optical varying devices (OVDs), at predetermined distances from one another so as to provide an OVD at the same location on each of the banknotes which are ultimately prepared from the film.

Films (a) and (b) were laminated by providing therebetween a laminating adhesive LDPE resin, Chevron 1017, available from Chevron Chemical Co., Houston, Tex. The laminating adhesive resin undergoes orienting in the machine direction during the laminating step itself, thereby imparting enhanced tear resistance in the transverse direction (TD). Lamination is carried out by conventional techniques, resulting in a multilayer film substrate having a final thickness of about 3.0 mils, the laminating adhesive resin itself providing about 0.7 mils thickness.

The resulting substrate was substantially clear and its physical properties are summarized in the Table below.

EXAMPLE 2 (COMPARATIVE)

Example 1 was repeated except that the laminating adhesive resin employed was an LLDPE laminating grade adhesive resin, Dowlex 3010, available from Dow Chemical Co. of Midland, Mich. The characteristics for the resulting substrate are set out in the Table below. Use of the higher molecular weight LLDPE as the adhesive resin in Example 2 resulted in increased TD tear strength.

EXAMPLE 3

This example demonstrates that film substrates produced in accordance with the present invention possess improved resistance to tearing.

A multilayer layer oriented film substrate having a 1.15 mil final thickness was prepared by coextruding HDPE with copolymer polypropylene skins on both sides to form a first layer (a). The HDPE resin employed was Oxychem M-6211, available from Occidental Chemical Corporation, Dallas, Tex., having a density of 0.96 and a melt index of 1.0. The copolymer polypropylene skins comprised 90% Chisso 7510, an ethylene-propylene-butene-1 terpolymer available from Chisso Corporation of Japan, and 10% Mobil LKA-753, a low density polyethylene available from Mobil Chemical Co., Norwalk, Conn. The HDPE comprised 90% of the resulting film layer (a) while the skins comprise 10% (5% on each side). The film (a) was then oriented 1.4 times in the MD at about 115° C. and 6 to 12 times, e.g., 10 times, in the TD direction at 115°–140° C. in a tenter frame.

The copolymer skins on the inner side of oriented layer (a) was then coated with a polyethyleneimine (PEI) primer to form clear 1.15 mil OHD film.

A second film (layer (b)) available from Tenchi Kikai Kabushiki Kaisha, Sakai, Osaka Prefecture, Japan, prepared from HDPE resin of melt index 1–1.5, coextruded with a homopolymer polypropylene skin and stretched about 7–8 times in the machine direction, having a film thickness of 0.95 mil was laminated to layer (a) using an adhesive. The lamination was conducted so that the transverse direction of orientation of the second layer was substantially normal to the transverse direction of orientation of the first layer. The resulting laminated film had a total thickness of 2.5 mil and exhibited excellent tear strength in both the machine direction and transverse direction at 72° F.

The physical properties of the films are summarized in Table 1.

TABLE 1

|  |  | Example 1 | Example 2 | Example 3 |
|---|---|---|---|---|
| Tensile | MD | 6 | 6 | — |
| (psi × 10³) | TD | 16 | 20 | — |
| Modulus | MD | 365 | 380 | — |
| Stiffness | MD | 17 | 20 | — |
| (grams) | TD | 21 | 24 | — |
| Tear Strength | MD | 89 | 63 | 38 |
| (g/mil) | TD | 4 | 5 | 34 |

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

What is claimed is:

1. A laminated multilayer film substrate comprising:

(a) an imbalanced biaxially oriented first layer comprising at least about 50 weight percent of a high density polyethylene having a density of at least about 0.95, said first layer oriented in at least a first direction to a degree which is at least three times greater than the degree of orientation present in a direction substantially normal to said first direction; and (b) an imbalanced biaxially oriented second layer comprising at least about 50 weight percent of a high density polyethylene having a density of at least about 0.95, said second layer oriented in at least a first direction to a degree which is at least three times greater than the degree of orientation present in a direction substantially normal to said first direction;

wherein said second layer is laminated to the film substrate so that said first direction of orientation of said second layer is substantially normal to said first direction of orientation of said first layer and wherein (a) further comprises a coextruded propylene copolymer skin on its inner side.

2. The film substrate of claim 1 wherein for each of said first and second layers the degree of transverse direction orientation is at least 4 times greater than the degree of machine direction orientation and wherein (a) comprises a propylene copolymer skin on both sides.

3. The film substrate of claim 1 wherein each of said first and second layers comprises a major proportion of a first HDPE having a density of 0.96 or higher and a melt index from about 0.6 to 1.2 and a second HDPE having a density of 0.96 or higher and a different melt index than said first HDPE.

4. The film substrate of claim 1 wherein each of said first and second layers comprises 50 to 98 weight percent of a first HDPE having a density of 0.96 or higher and a melt index of greater than 0.5 to 2.0; 1 to 25 weight of a second HDPE having a density of 0.96 or higher and a melt index of 0.1 to about 0.5; and 1 to 25 weight percent of a third HDPE having a density of 0.96 or higher and a melt index of greater than 2.0 to about 8.

5. The film substrate of claim 4 wherein for each of said first and second layers said first HDPE comprises at least about 84 weight percent and said second and third HDPE resins each comprises 3 to 8 weight percent of said film.

6. The film substrate of claim 1 in the form of a bank note.

7. The film substrate of claim 2 in the form of a bank note.

8. The film substrate of claim 3 in the form of a bank note.

9. The film substrate of claim 4 in the form of a bank note.

10. The film substrate of claim 5 in the form of a bank note.

11. The film substrate of claim 6 further comprising a clear window through the bank note.

12. The film substrate of claim 1 wherein (b) further comprises a homopolymer propylene skin.

13. The film substrate of claim 1 wherein said second layer is laminated to the film substrate with a laminating adhesive resin.

14. The film substrate of claim 13 wherein said laminating adhesive resin is selected from the group consisting of low density polyethylene (LDPE) and linear low density polyethylene (LLDPE).

* * * * *